No. 844,810. PATENTED FEB. 19, 1907.
I. KITSEE.
METHOD OF INCREASING THE EFFICIENCY OF ALTERNATING CURRENTS.
APPLICATION FILED JULY 11, 1903.
2 SHEETS—SHEET 1.
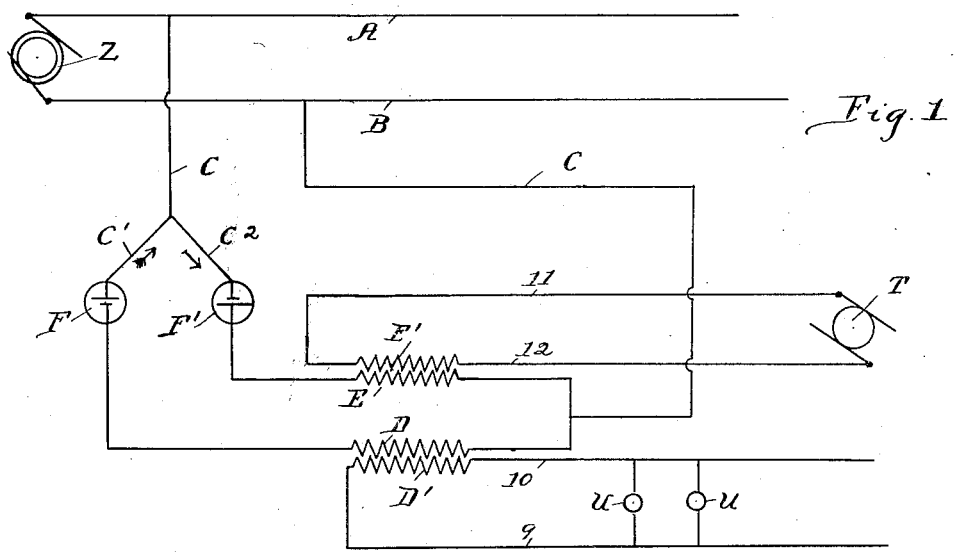
Fig. 1
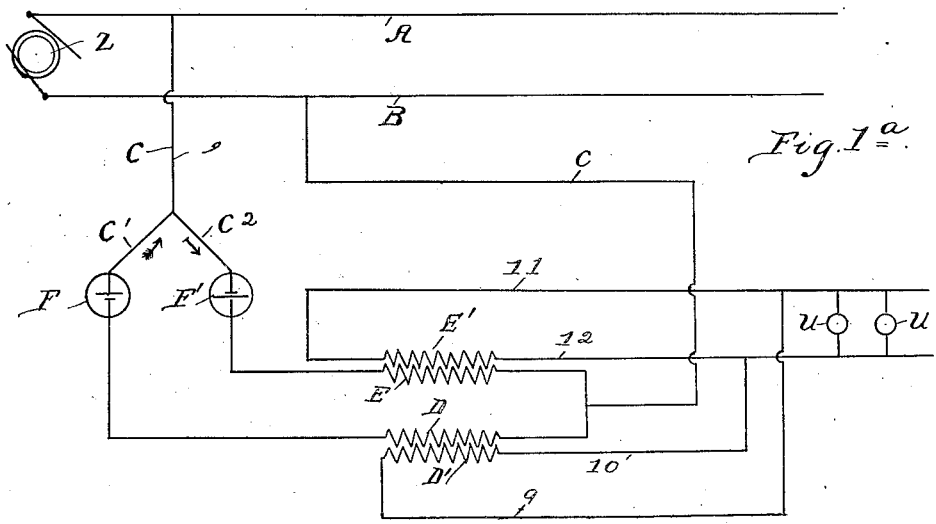
Fig. 1ª

No. 844,810. PATENTED FEB. 19, 1907.
I. KITSEE.
METHOD OF INCREASING THE EFFICIENCY OF ALTERNATING CURRENTS.
APPLICATION FILED JULY 11, 1903.
2 SHEETS—SHEET 2.
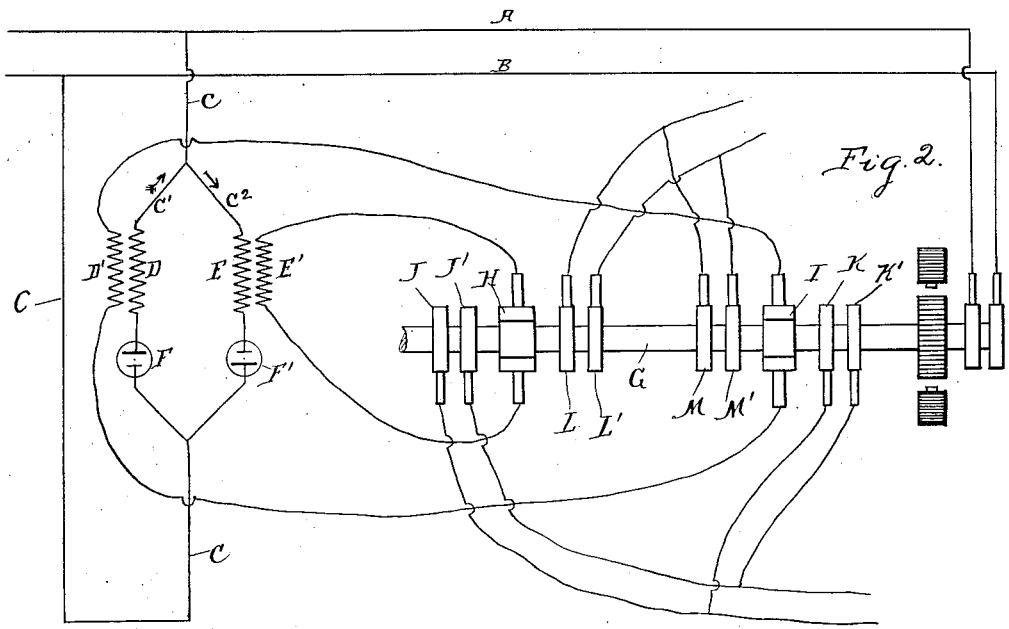
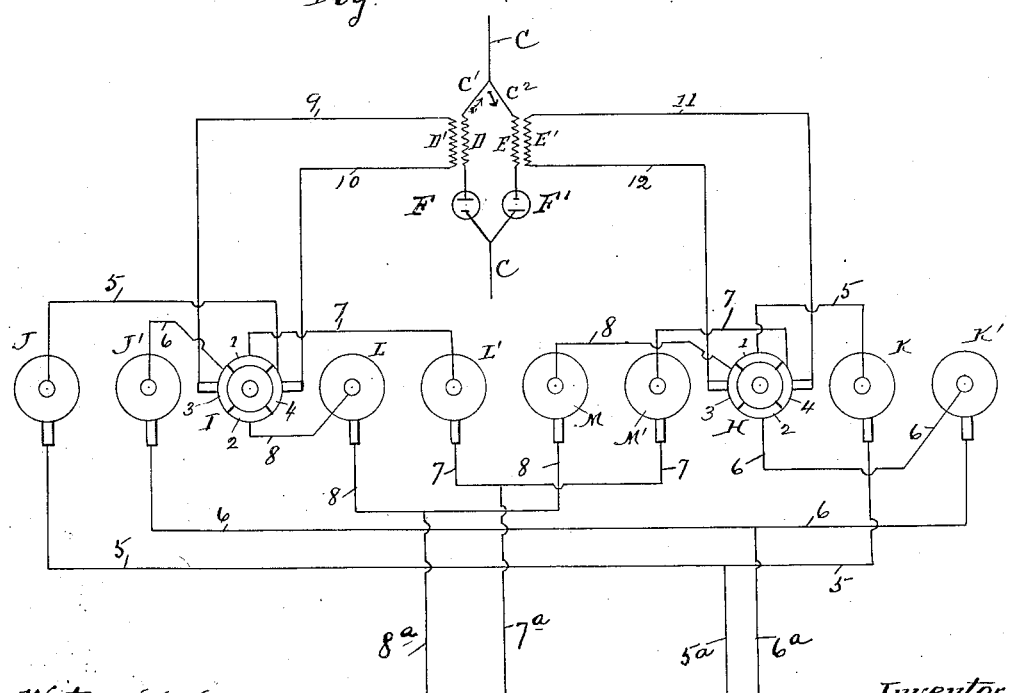
Witnesses.
Edith P. Stilley
Rossiter W. ——
Inventor:
Isidor Kitsee

UNITED STATES PATENT OFFICE.

ISIDOR KITSEE, OF PHILADELPHIA, PENNSYLVANIA.

METHOD OF INCREASING THE EFFICIENCY OF ALTERNATING CURRENTS.

No. 844,810. Specification of Letters Patent. Patented Feb. 19, 1907.

Application filed July 11, 1903. Serial No. 165,155.

*To all whom it may concern:*

Be it known that I, ISIDOR KITSEE, of the city and county of Philadelphia, State of Pennsylvania, have invented certain new and useful Improvements in the Method of Increasing the Efficiency of Alternating Currents, of which the following is a specification.

My invention relates to an improvement in the method of increasing the efficiency of currents capable of inducing secondary impulses in a neighboring conductor, and has more special reference to the increase of efficiency of alternating currents.

To transform alternating currents with the aid of a double coil provided with a soft-iron core—"transformer," so called—is well understood. Through the flow of the current in alternating opposite direction impulses are induced in the secondary coil of such a transformer. These impulses are always flowing in the direction opposite to the direction of the inducing impulses.

In the art of transforming or converting alternating currents only the change in direction is made use of, and each cycle, consisting, as it does, of two alternations—one in each direction—is made to induce only in the secondary one similar cycle consisting also of two alternations—one in each direction—and the energy in the secondary is equal to the spent energy in the primary, minus the loss due to conversion.

It is the object of my invention to increase this inductive capacity of the primary coil on the secondary, and to make more clear the method by which I accomplish this result I will first give in general the operations governing the principle of induction as applicable to this my invention.

The law that a current which commences to flow will induce a current of opposite direction in a neighboring conductor and that a current which ceases to flow will induce a current of a direction similar to the direction of the primary current formerly flowing is well understood and does not need to be repeated. It is therefore not the flow of the current as such which is capable of inducing energy in the secondary, but it is only the momentary impulses due to the commencing or ceasing of the flow, and in the alternating current it is therefore not the flow of the impulses which induce impulses in the secondary, but these induced impulses are only due to the change in direction, or, in other words, to the ceasing of the current-flow in one direction and the commencing of the flow in the opposite direction. Both of these periods induce impulses of one and the same direction in the secondary. As the inducing influence of such electric energy can be likened to the inducing influence of mechanical energy, it is purposed for the sake of a clear understanding to use the following illustration: Let us suppose that a vehicle is moving at a certain speed in a certain direction and the passenger is standing in said vehicle facing in the direction in which the vehicle is traveling. Should the vehicle come to a standstill, the passenger, if not supported, will fall forward—that is, in the direction in which the vehicle was moving. If now the passenger arights himself and the vehicle starts again to move in the former direction, then the passenger will fall backward. Now let us suppose that the passenger has again righted his position and the vehicle continues to move at the same speed in the same direction. The passenger will not be affected by this movement no matter how long the same continues, provided that the speed is always the same. If we now liken the flow of the current to the running of the vehicle, then we can easily see that just as the starting of the vehicle and the stopping of the same induce a movement in the passenger, so the starting and ceasing of the flow of the current will induce electric movement in the secondary, but just as the continuous movement of the vehicle in one direction will not affect the passenger at all, so the continuous flow of the current will not affect the electric condition of a neighboring conductor at all, and as in the illustration the strength and quickness of the starting and the quickness of the stopping induce corresponding greater or lesser motion in the passenger of a vehicle so the volume of the current and quickness of its starting or ceasing will induce corresponding greater or lesser change in the electric condition of the secondary.

I have given the status of the passenger at the starting and stopping of the vehicle. Now, instead of alternately starting and stopping, the vehicle alternately changes its direction of travel. This change in direction will result in the same movement of the passenger as the former starting and stopping, or vice versa. It is therefore clearly shown that the movement of the vehicle in alternate direction is equal to the alternate starting and stopping of the same, and the movement of the current in alternate direction is therefore equal to the alternate starting and ceasing of the flow of same and that no matter how long a time intervenes between the starting and stopping or how long a time intervenes between the change of movement in opposite direction this time will not have any influence on the inductive action. Under no consideration, therefore, will the electric change induced in the secondary be greater or lesser if after the commencing of the flow of the current in the primary the same will continue to flow for a greater or lesser period. So, also, will the electric change induced in the secondary not be greater or lesser if after the stopping of the flow of the current in the primary a greater or lesser time will intervene before starting again, and as the starting and stopping is equal to an alternate flow it is only the number of alternations or cycles in a given unit of time which will influence the electric condition in the secondary, and not the time intervening between one alternation and the next following. Bearing this in mind, the method and apparatus, as will hereinafter be described and as is illustrated in the drawings, will be clearly understood.

Referring now to the drawings, Figures 1 and 1ª are diagrammatic views of the circuits and devices attached thereto for the purpose of increasing the efficiency of the alternating current generated at Z. Fig. 2 is a side elevation of the apparatus with the circuits in diagram for the purpose of reuniting induced impulses. Fig. 3 is a diagrammatic view illustrating more in detail the circuits as connected to the different parts of the apparatus for reuniting the impulses.

In Fig. 1, Z is the source of current, here shown as an alternating dynamo. A and B are the main lines. C is the derived circuit. This derived circuit has the two branches C' and C², and each of these derived branches is provided with a device adapted to allow the flow of the current in one direction and adapted to estop the flow of the current in the opposite direction. These devices are here shown as asymmetrical cells F and F', apparatuses well known to persons versed in the art. The principle of these devices based thereon—that, for instance, an electrode of aluminium in a suitable electrolyte will allow the current to pass in a direction so that this aluminium element should become the negative, but will not allow the current to pass in the opposite direction, in which case the aluminium would become the positive, and as, as said above, this device, its construction and use is now a well-known and established fact and its special construction does not form part of my invention—therefore it is unnecessary for me to give the same more in detail, and it is sufficient to remark here that any device which will fulfil the office of this apparatus known as "asymmetrical cells" may be substituted therefor. In the branch C' is placed the primary D of a converter, and in the branch C² is placed the primary E of a similar converter. These primaries are provided with secondaries D' and E', respectively, and in the circuit of D' are placed the consuming devices U U, and in the circuit of E' is placed the consuming device T, here shown as a motor. The operation of this arrangement is as follows: The current generated at Z will flow from the wire A through the wire C, and that part of the cycle which will flow, as is indicated by the featherless arrow, downward will flow through the branch C², and that part of the cycle which will flow, as is indicated by the feathered arrow, upward will flow through the branch C'. We will therefore have in each branch one period in which the current is flowing and a like period in which no current is flowing. The flow of the current, or rather the commencement of the flow of the current, in each branch will induce currents of opposite directions in the secondaries of the primaries placed in these branches, and the ceasing of the flow of this current will during the period that such current is not flowing induce currents of a like direction in these secondaries. To make this operation clearer, let us suppose that the current is now flowing in the direction as indicated by the featherless arrow and is therefore flowing only through the branch C² with its primary E. In the secondary E' of the primary E will therefore be induced a current flowing in said secondary in the opposite direction from the current flowing at E. Let us suppose that now the second part of the cycle commences—that is, that the alternating current generated at Z will now flow in the direction as indicated by the feathered arrow. This phase of the current will not be able to flow through the branch C², but will flow entirely through the branch C' and its primary D. This flow of the current will therefore induce a current in the opposite direction in the secondary D', as is usually the case in transformers; but at one and the same time the ceasing of the flow of the current in C², and therefore in the primary E, will induce impulses in E' flowing in a direction in which the current formerly flowed therein. In both these branches, therefore, currents will be induced in their respective secondaries for each part of the alternation, and we will have in both the secondary circuits a continuous flow of alternating impulses, and these alternating-impulses will actuate the consuming devices U and T.

So far the operation of the device was a simple one, and it was only necessary to provide for each part of the alternation a separate path and to provide for each path a primary and a secondary for said primary, so as to be enabled to feed consuming devices from each secondary; but in the practical use of the impulses generated in these secondary circuits it has to be considered that the potential of these impulses will vary. Impulses flowing in one direction will have a potential far higher than the potential of the impulses flowing in the opposite direction. This is a great drawback where either motors or lights have to be operated with such currents. This difference of potential is a direct result of the manner in which the induction in the above arrangement takes place, for, whereas the flow of the current in the primary will induce impulses in the secondary in exact ratio where the secondary is wound for the same voltage, the ceasing of the flow in the primary will result therein that in the secondary a potential of far higher voltage will be induced than the potential of the former primary current. In other words, a current of a given potential and volume will induce impulses of a given potential and volume through the commencing of the flow, but will induce an impulse of far less volume and far higher potential through the ceasing of its flow. Should, therefore, the impulses generated in the secondaries of the arrangement as above described be practically utilized in an efficient manner, it is necessary to rearrange or readjust the same, so that only impulses of one potential and value shall flow in one circuit and the impulses of high potential and less volume shall flow in a second circuit. To be more precise, to utilize the induced impulses in a secondary circuit it is necessary that the potential and volume of the flowing current shall not vary, but shall remain as much as possible constant, and this condition is brought about by the arrangement as illustrated in Fig. 2 and in Fig. 3. In these figures, A and B are the main lines; C, the derived circuit, of which C' and C² are the branches, provided with the primaries D and E, respectively, and the asymmetrical cells F and F', respectively, the primary D, provided with the secondary D', and the primary E, provided with the secondary E'; but instead of the circuit of each secondary being connected directly to the consuming device, as was illustrated in Fig. 1, these secondaries are now connected to what I call an "adjusting" device, whereby the impulses of one potential generated in both secondaries are adjusted in a manner so as to flow in one consuming-circuit and the impulses of a different potential generated in both secondaries are made to flow in the second consuming-circuit. This device consists of the two commutators H and I, the commutator H provided with the contact-rings J J' and L L' and the commutator I provided with the contact-rings M M' and K K', all mounted on the shaft G. Each of the commutators embrace the segments 1, 4, 2, and 3. The segments 4 and 3 of the commutator I are connected, through wires 5 and 6, with the contact-rings J J', respectively, and the segments 1 and 2 of the same commutator are connected, through wires 7 and 8, with the contact-rings L' and L, respectively, and through said contact-rings with the contact-rings M M'. These contact-rings are again connected, through wires 8 and 7, with the segments 3 and 4 of the commutator H. The other two segments 1 and 2 are connected, through wires 5 and 6, with the contact-rings K and K', respectively. The contact-ring K is again, through wire 5, in contact with the ring J and the contact-ring K', through wire 6, in contact with the ring J'. The secondary D' is, through wires 9 and 10, in electrical contact with the commutator I, and the secondary E' is, through wires 11 and 12, in electrical contact with the commutator H. From the wires 8 and 7 branches the consuming-circuit 8ª and 7ª, and from the wires 6 and 5 branches the consuming-circuit 6ª and 5ª. The shaft G is rotated with the aid of a motor, the current of which is taken for its armature or revoluble part from the source A and B, and the armature will therefore be actuated in unison with the change of alternation in the flow of the current generated at Z, and therefore of the current transformed at D and E.

The operation of the device is as follows: As long as the terminals of D', through the wires 9 and 10 and their appended brushes, are in electrical contact with the segments 3 and 4 of the commutator I the impulses generated at D' will flow from D' into the consuming-circuit embracing the wires 5ª and 6ª, for the reason that the wires 9 and 10 are, through the segments 3 and 4 and the rings J and J', in electrical contact with the circuit 6 and 5, from which the wires 6ª and 5ª branch, and if at the same time the secondary E' is, through the wires 12 and 11 and their appended brushes, in electrical contact with the segments 3 and 4 of the commutator H then the impulses generated at E' will flow from E' into the consuming-circuits embracing the wires 7ª and 8ª, for the reason that the wires 12 and 11 are, through segments 3 and 4 and the rings M and M', in electrical contact with the circuit 7 and 8, from which the wires 7ª and 8ª branch. Let us now suppose that the consuming-circuit 5ª and 6ª is adapted to actuate a device with a current of a potential as is induced by the commencing of the flow of the current and let us suppose that the consuming-circuit 7ª and 8ª is adapted to actuate a device with a current of a potential as is induced by the ceasing of the flow of the current and let us suppose that during the period that the brushes of the secondary D' rest, as illustrated, on the segments 3 and 4 of the commutator I a current commences to flow through the primary D. It follows that in D' will be induced an impulse of a potential in exact proportion to the potential of the primary current and the ratio of the winding between the primary and secondary coil, and these impulses will flow to the consuming-circuit 5ª and 6ª, but at the same time the current will cease to flow through the primary E and a current will be induced in E' of a potential higher than the potential of the current induced in D', for the reason that the ceasing of the flow always induces higher potential, and as at that period the terminals of the wires 12 and 11, as is illustrated in the drawings, rest on the segments 3 and 4 of the commutator H the impulses of high potential induced in E' will flow through the consuming-circuit 7ª and 8ª. Let us now consider that the shaft is always in motion and rotating in unison with the alternation of the current generated. It follows that for part of the alternation the commutators I and H will be moved so as to bring their brushes in electrical contact with the next following segment, and as during the time that the low-potential impulses were generated in D' the brushes of the same came in electrical contact, through segments 3 and 4, with the consuming-circuit 6ª and 5ª these same brushes will come in contact during the next interval of time—that is, during the ceasing of the current-flow through segments 1 and 2—with the consuming-circuit 7ª and 8ª, and at the same time the terminals of E' will be moved from the segments 3 and 4 of the commutator H and will come in contact with the segments 1 and 2 and through same with the consuming-circuit 5ª and 6ª, and as at this time the current will flow through E it is obvious that the impulses induced in E' will be of low potential. Therefore it will be seen that each secondary will be brought in electrical contact with the consuming-circuit consisting of the wires 5ª and 6ª during the time that impulses of low potential are induced in said secondaries and will be brought in electrical contact with the consuming-circuit 7ª and 8ª during the time that impulses of high potential will be induced in said secondaries.

From this description persons versed in the art will readily understand that we have here two consuming-circuits each provided always with a current of a predetermined potential and of a predetermined value, being constant as long as the current generated at Z remains constant. These, in broad outlines, are the arrangements as illustrated; but it is obvious that parts of same may differ without departing from the scope of my invention.

In Fig. 1 I have illustrated my invention in connection with two consuming-circuits, in each of which alternating currents of varying potential are flowing, and in Figs. 2 and 3 I have illustrated the manner in which these two consuming-circuits can be, with the help of commutating devices, brought in such relation to the induced impulses that in each of them a current differing in potential from that of the other is made to flow; but in some cases this device cannot be advantageously employed, and yet it would be of great importance, even in such cases, to have in the consuming-circuit a flow of current wherein each part of each cycle should be of approximately the same potential, and in Fig. 1ª I have illustrated the arrangement whereby such results are possible to attain. In this figure both of the consuming-circuits are connected together in a manner so that the impulses induced in one circuit should flow in the same direction as the impulses induced in the other circuit at one and the same time. We will therefore have in the consuming-circuit, simultaneously with the impulses induced by the starting of the current-flow in one primary, impulses induced by the ceasing of the flow of the current in the second primary. Let us suppose that the current is now flowing in the direction of the featherless arrow through the branch C². A current will therefore flow in the secondary E' and therefore in the consuming-circuit containing the lamps U U from the right to left; but at the same time as the current has ceased to flow through the branch C' a current will be induced in the secondary D', also flowing from right to left, and as this second circuit is connected through wire 9 with wire 11 of the first circuit it follows that both of these impulses will flow in the circuit containing the lamps in one and the same direction. If now the current-flow through C² ceases, then there will be developed in E' a current flowing from left to right in the circuit containing the consuming device, and as at the same time the current commences to flow through C' then there will be developed in the secondary D' a current also from left to right, and both of these impulses will then flow in the same direction through the consuming-circuit. It is true that the combined impulse flowing at one and the same time through the consuming-circuit has two different values, consisting, as it does, of one impulse of comparative low potential, but large volume, and one impulse of comparative high potential will be flowing as one united impulse and as and small volume; but as both these impulses each united impulse will have the same double value the consuming device U U will not be unduly affected by this double potential.

No doubt the arrangements as illustrated in Figs. 2 and 3 will be preferred in most cases; but it was necessary for me to point out the advantage of this my invention in such cases where an adjusting device cannot be advantageously employed.

Having now described my invention, what I claim as new, and desire to secure by Letters Patent, is—

1. The method of increasing the efficiency of alternating currents, which consists in causing one half of each cycle to flow through one branch of a circuit, and the other half of each cycle to flow through a second branch of said circuit, each of said branches having a primary of a transformer, and causing the impulses induced in the secondary of each transformer to flow through a consuming-circuit.

2. The method of increasing the efficiency of alternating currents, which consists in causing two impulses to be induced in the secondary of one transformer through the flow and ceasing of the flow of one half of each cycle, causing two impulses to be induced in the secondary of a second transformer through the flow and ceasing of the flow of the second half of said cycle, and causing the impulses of both secondaries to flow through consuming devices.

3. The method of increasing the efficiency of alternating currents, which consists in causing one part of a cycle of an alternating current to flow through one conducting-path, and the second part of said cycle to flow through a second conducting-path, each path provided with the primary of a transformer, and causing to be induced in each secondary of said transformers two impulses for each half of said cycle.

4. The method of increasing the efficiency of alternating currents, which consists in inducing impulses in two secondaries, the impulses induced in one secondary being generated by the alternate commencing and ceasing of the flow of the current through one primary, and the impulses induced in the second secondary being generated by the alternate ceasing and commencing of the flow of the current through a second primary.

5. The method of increasing the efficiency of alternating currents, which consists in inducing an impulse in the secondary of a transformer by the flow of one part of an alternating cycle simultaneously with the inducing of an impulse in the secondary of a second transformer by the ceasing of the flow of another part of said cycle, and causing said induced impulses to flow through a consuming-circuit.

6. The method of increasing the efficiency of alternating currents, which consists in causing the first part of an alternating cycle to induce an impulse in the secondary of a transformer, causing the second part of said cycle to induce an impulse in another secondary, and causing both of said impulses to flow through separate consuming-circuits.

7. The method of increasing the efficiency of alternating currents, which consists in inducing impulses in two secondaries, the impulses induced in one secondary being generated by the alternate commencing and ceasing of the flow of the current in one direction, and the impulses induced in the other secondary being generated by the alternate ceasing and commencing of the flow of the current in the opposite direction.

8. The method of increasing the efficiency of alternating currents, which consists in inducing impulses in two secondaries, the impulses in each secondary being alternately of high and low potential, and then readjusting the impulses induced in both secondaries so that the impulses of low potential are caused to flow through one consuming-circuit, and the impulses of the higher potential are caused to flow through a second consuming-circuit.

9. The method of increasing the efficiency of alternating currents, which consists in inducing impulses in two secondaries, the impulses in one secondary being alternately of low and high potential, and the impulses in the second secondary being alternately of high and low potential, and then readjusting the impulses induced in both secondaries so that the impulses of one potential are caused to flow through one consuming-circuit, and the impulses of the higher potential are caused to flow through a second consuming-circuit.

10. The method of increasing the efficiency of alternating currents, which consists in causing an impulse to be induced in one secondary through the ceasing of the flow of one alternation of an alternating current, simultaneously causing an impulse to be induced in a second secondary through the commencing of the flow of a second alternation, reversing said conditions in said secondaries, causing the impulses of both secondaries induced through the commencing of the flow to flow in one consuming-circuit, and causing the impulses of both secondaries induced through the ceasing of the current-flow to flow in a second consuming-circuit.

11. The method of increasing the efficiency of alternating currents, which consists in causing one impulse to be generated in each of two secondaries for each change in the primary current, each of said impulses being of a different potential, and causing the impulses of like potential of both of said secondaries to flow through separate consuming-circuits.

12. The method of increasing the efficiency of alternating currents, which consists in causing two impulses to be induced in each of two secondaries through each cycle of an alternating current, one impulse in each of said secondaries being generated by the flow of part of each of said cycles, and the other impulse in each of said secondaries being generated by the ceasing of the flow of the current of each part of each of said cycles.

13. The method of increasing the efficiency of alternating currents, which consists in causing the first part of each cycle of an alternating current to travel through the primary of one converter, causing the second part of said cycle to travel through the primary of a second converter, and causing each part of said cycle to induce in the secondaries of the primaries a complete cycle consisting of two alternations each of which is in opposite direction.

14. The method of increasing the efficiency of alternating currents, which consists in causing each cycle of an alternating current to induce two impulses in each of the secondaries of two converters, one impulse in each of the secondaries being generated by the flow of the current in the primary of said secondaries, and the other impulse being generated by the ceasing of the flow in said primaries.

15. The method of increasing the efficiency of alternating currents, which consists in causing each cycle of an alternating current to induce two impulses flowing in opposite directions in each of the secondaries of two converters, and causing said induced impulses to flow through consuming devices.

16. The method of increasing the efficiency of alternating currents, which consists in causing two impulses to be simultaneously induced through each half of a complete cycle of an alternating current, one of said impulses being induced in each of the secondaries of two converters, and causing said impulses to flow through consuming devices.

17. The method of increasing the efficiency of alternating currents, which consists in causing one half of each cycle to flow through one conducting-path, and the other half of said cycle to flow through a second conducting-path, each of said paths containing the primary of a transformer, causing a complete cycle to be induced in each of the secondaries of said transformers, and causing each of said cycles in each of said secondaries to flow through consuming devices.

In testimony whereof I hereby sign my name, in the presence of two subscribing witnesses, this 6th day of July, A. D. 1903.

ISIDOR KITSEE.

Witnesses:
   EDITH P. STILLEY,
   R W. WILLROHAM.